(12) United States Patent
Jiménez Giménez et al.

(10) Patent No.: US 12,614,969 B2
(45) Date of Patent: Apr. 28, 2026

(54) MODULATION MODE FOR A SWITCHING POWER CONVERTER

(71) Applicants: Gamesa Electric, S.A. Unipersonal, Zamudio (ES); Universidad Carlos III de Madrid, Getafe (ES)

(72) Inventors: Jorge Jiménez Giménez, Madrid (ES); Gonzalo Moreno Huerta, Aranjuez (ES); Pablo Moreno-Torres Concha, Leganes (ES); Antonio Lazaro Blanco, Leganes (ES)

(73) Assignees: GAMESA ELECTRIC, S.A. UNIPERSONAL, Zamudio (ES); UNIVERSIDAD CARLOS III DE MADRID, Getafe (ES)

( * ) Notice: Subject to any disclaimer, the term of this patent is extended or adjusted under 35 U.S.C. 154(b) by 196 days.

(21) Appl. No.: 18/568,720

(22) PCT Filed: Jun. 7, 2022

(86) PCT No.: PCT/EP2022/065399
§ 371 (c)(1),
(2) Date: Dec. 8, 2023

(87) PCT Pub. No.: WO2022/258615
PCT Pub. Date: Dec. 15, 2022

(65) Prior Publication Data
US 2024/0275261 A1      Aug. 15, 2024

(30) Foreign Application Priority Data

Jun. 11, 2021     (EP) .................................... 21382520

(51) Int. Cl.
H02M 1/00          (2007.01)
H02M 1/088        (2006.01)
H02M 3/158        (2006.01)

(52) U.S. Cl.
CPC ......... *H02M 1/0048* (2021.05); *H02M 1/088* (2013.01); *H02M 3/158* (2013.01)

(58) Field of Classification Search
CPC ..... H02M 1/0048; H02M 1/088; H02M 3/158
See application file for complete search history.

(56) References Cited

U.S. PATENT DOCUMENTS

| | | | | |
|---|---|---|---|---|
| 5,428,522 A | * | 6/1995 | Millner | ............. H02M 7/53871 363/63 |
| 2004/0239299 A1 | | 12/2004 | Vinciarelli | |

(Continued)

OTHER PUBLICATIONS

PCT International Search Report and Written Opinion of International Searching Authority mailed Jul. 22, 2022 corresponding to PCT International Application No. PCT/EP2022/065399 filed Jun. 7, 2017.

(Continued)

*Primary Examiner* — Rafael O De Leon Domenech
(74) *Attorney, Agent, or Firm* — Schmeiser, Olsen & Watts LLP

(57)          ABSTRACT

A method of operating a switching power converter is provided wherein the power converter includes an inductor and switches and is operable in a modulation mode in which a current through the inductor is modulated by operating the power converter in a repeating sequence of predetermined switching states. The method includes controlling a current waveform of the current through the inductor in the modulation mode by controlling the transition between the switching states of the sequence. The current waveform is controlled to include within one period of the current waveform a first section of rising current corresponding to a first switching state, a second section corresponding to a second switching state, wherein the second section of the current waveform does not reach or cross a zero value of the current, (Continued)

and a third section of falling current corresponding to a third switching state.

15 Claims, 11 Drawing Sheets

(56) References Cited

U.S. PATENT DOCUMENTS

| | | | |
|---|---|---|---|
| 2015/0171744 A1 | 6/2015 | Fabbro | |
| 2017/0194854 A1 | 7/2017 | Cherkassky et al. | |
| 2017/0331363 A1* | 11/2017 | Travaglini | H02M 3/158 |
| 2018/0062537 A1* | 3/2018 | Wang | H02M 1/08 |
| 2019/0013683 A1 | 1/2019 | Greening | |

OTHER PUBLICATIONS

A Novel Low-Loss Modulation Strategy for High-Power Bidirectional Buck + Boost Converters, S. Waffler and J. W. Kolar, in IEEE Transactions on Power Electronics, vol. 24, No. 6, pp. 1589-1599, Jun. 2009.

* cited by examiner

FIG 15

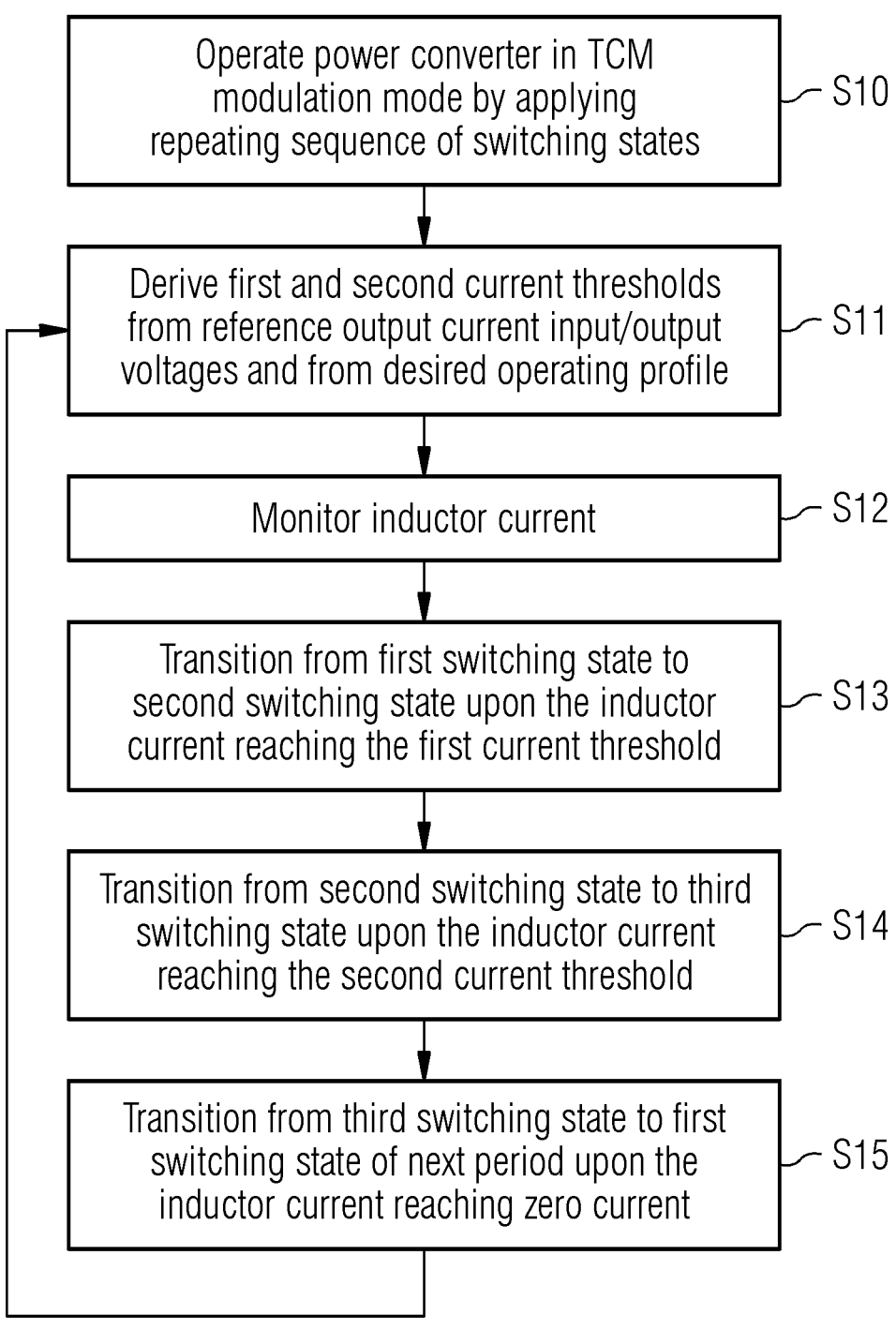

Operate power converter in TCM modulation mode by applying repeating sequence of switching states — S10

Derive first and second current thresholds from reference output current input/output voltages and from desired operating profile — S11

Monitor inductor current — S12

Transition from first switching state to second switching state upon the inductor current reaching the first current threshold — S13

Transition from second switching state to third switching state upon the inductor current reaching the second current threshold — S14

Transition from third switching state to first switching state of next period upon the inductor current reaching zero current — S15

MODULATION MODE FOR A SWITCHING POWER CONVERTER

CROSS-REFERENCE TO RELATED APPLICATIONS

This application claims priority to PCT Application No. PCT/EP2022/065399, having a filing date of Jun. 7, 2022, which claims priority to EP Application No. 21382520.1, having a filing date of Jun. 11, 2021, the entire contents both of which are hereby incorporated by reference.

FIELD OF TECHNOLOGY

The following relates to a method of operating a switching power converter, in particular a bidirectional DC-DC power converter, in which a repeating sequence of switching states is applied. The following further relates to such switching power converter, to a respective controller and to a computer program for controlling the operation of such power converter.

BACKGROUND

Bidirectional DC-DC power converters find many fields of application, such as for energy storage applications. It may for example be desirable to connect a DC-bus of a grid tied inverter, such as of a wind turbine, to an energy storage device, in particular a battery pack. For most battery chemistries, a respective voltage range is required for charging and discharging the battery. The battery must thus be coupled via a bidirectional DC-DC power converter to the DC bus to provide the required voltages for charging and discharging and to provide bidirectional power flow. The converter must then be capable of stepping down (buck mode), stepping up (boost mode), or stepping up or down (buck-boost mode) the voltage via maintaining the bidirectional power flow capability.

Conventional DC-DC power converters are known which provide respective capabilities. Such converters employ a modulation technique that changes the converter operation between different switching states at predetermined times or trigger points to achieve the desired input/output voltages and power transfer. A typical example of a respective modulation mode is the boundary conduction mode (BCM) in which the inductor of the converter is periodically charged and discharged by changing the switching states. The document "A Novel Low-Loss Modulation Strategy for High-Power Bidirectional Buck+Boost Converters," S. Waffler and J. W. Kolar, in IEEE Transactions on Power Electronics, vol. 24, no. 6, pp. 1589-1599, June 2009, describes a modulation mode in which a constant modulation frequency is used for modulating the current through the inductor of the power converter by the sequential switching of MOSFET switches. To achieve zero voltage switching for the MOS-FETs, a negative offset current through the inductor is used at the beginning and end of each period of the modulation waveform to allow the MOSFET switches to turn on when the anti-parallel body diode of these MOSFETs is conducting. This resulting large dead time leads to relatively high RMS currents and conduction losses. Such method is further less flexible and in particular requires a fixed modulation frequency.

Other known methods suffer from relatively high power losses, especially in the buck-boost mode. Most conventional modulation techniques employ triangular current waveforms, such as the above-mentioned boundary conduction mode or the continuous conduction mode (CCM). It is desirable to reduce such power losses and in particular to provide an operation of such switching power converter that is flexible, reduces losses, allows interleaving operation, and can be employed for a wide range of applications.

The document US 2004/239299 A1 describes buck-boost DC-DC switching power conversion, wherein a switching sequence includes an input phase, an in-out phase, a freewheel phase and a clamped phase, as well as several zero voltage switching phases arranged therebetween.

The document US 2017/194854 A1 describes a switched mode DC-DC converter for hand-held and internet-of-things applications that includes four switching states and that employs a frequency control loop.

The document US 2015/171744 A1 describes a buck-boost converter operating in a pulse frequency modulation mode, which employs several voltage thresholds to switch between a charging phase, a transfer phase, a discharging phase and a dumping phase of the converter.

SUMMARY

Accordingly, there is a need to mitigate at least some of the drawbacks mentioned above and to improve the operation of such switching power converter, in particular to achieve low losses while rendering operation flexible.

In a first aspect, a method of operating a switching power converter, in particular a bidirectional DC-DC power converter, is provided. The power converter comprises an inductor and plural switches that are switchable to couple (in particular selectively connect) the inductor to terminals of the power converter. The method comprises operating the power converter in a modulation mode (which may be termed "three-stage conduction mode", TCM) in which a current through the inductor is modulated by operating the power converter in a repeating sequence of predetermined switching states of the switches. The method includes controlling a current waveform of the current through the inductor in the modulation mode by controlling the transition between the switching states of the sequence, wherein the current waveform is controlled to include within one period of the current waveform a first section of a rising current corresponding to a first switching state, a second section corresponding to a second switching state, wherein the second section of the current waveform does not reach or cross a zero value of the current, and a third section of falling current corresponding to a third switching state. The current waveform is controlled so as to allow the length of the period of the current waveform to change. In other words, a frequency of the modulation of the inductor current is variable.

Modulating the inductor current in such way may provide several benefits. By making use of three switching states to obtain the three sections of the current waveform, switching losses and conduction losses may be kept low, thus reducing the conversion losses of the power converter. Such type of waveform may allow the current to flow quite uniformly through all switches throughout the period, thereby reducing conduction losses. Further, by such current waveform, a lower RMS current may be achieved, resulting in a lower switching and conduction losses in all converter operating ranges. Furthermore, zero current switching may be implemented at the transition from the third section of the waveform to the first section of the waveform, thus reducing the switching losses. Further, by allowing the period of the current waveform to change, i.e. not operating with a fixed modulation frequency, but allowing variable frequency operation, further benefits can be achieved. In particular, an additional degree of freedom can be obtained in the control of the current waveform. For example, the duration of the second section may be adjusted to allow an adjustment of the current waveform and thus of the RMS current through the inductor. Switching and conduction losses may thus be reduced, at the expense of ripple of the output current. This allows a tuning of the converter in terms of converter efficiency and output current characteristics. Furthermore, it allows an adjustment of the modulation frequency, i.e. the switching frequency, according to the needs of the respective application for which the converter is intended to be used. Versatility and range of operation of the converter may thus be increased. If the period of the waveform is for example increased (e.g. by increasing the duration of the second section), the modulation frequency and thus the frequency of the switching of the switches is reduced, thereby reducing switching losses. The RMS of the inductor current (also termed "phase current" herein) is also reduced, further reducing conduction losses. It should be clear that 'rising current' and 'falling current' may relate to the current value irrespective of the direction of the current flow, i.e. may relate to the current magnitude or absolute value. The respective waveform of the current magnitude may thus be generated for each direction of current flow through the inductor.

The period may be changed by changing the timing of the transition between the switching states, e.g. by adjusting the time during which the first switching state, the second switching state, and/or the third switching state is applied. This can occur by setting respective limits for triggering the transition. The switching state designates/defines the on/off states of the switches of the power converter; it may also be termed "conduction scheme". As the current waveform is generated by sequentially applying the switching states, the duration/period of the switching sequence corresponds to one period of the current waveform. The switching sequence is repeatedly applied, resulting in a periodic modulation of the inductor current. It should be clear that the switching sequence, in particular the timing of the transition between the switching states of the switching sequence, can be adjusted during operation of the power converter, for example for adjusting the output voltage or the power flow.

The first section of the current waveform may for example follow in direct succession to the third section of the preceding period of the current waveform. In other words, the first switching state may directly follow upon the third switching state of the preceding switching sequence. There may accordingly be no zero-current section between the third section and the next first section, but the current waveform may end with the third section and start with the first section. An efficient operation may thereby be achieved, since lower peak currents may be needed by avoiding an additional section of almost zero current. Further, in such type of operation, the period of the waveform can directly be adjusted by adjusting the length of the first, second or third sections, desireably of the second section.

The second section of the waveform may follow in direct succession to the first section, and the third section may follow in direct succession to the second section of the waveform. In particular, within one waveform period, the waveform may consist of the first section, the second section and the third section. An efficient but simple operating scheme may thereby be achieved. Put differently, the sequence of predetermined switching states may consist of the first switching state, the second switching state and the third switching state.

In an example, a magnitude of the slope of the second section of the current waveform is less than a magnitude of the slope of the first section and/or the third section of the current waveform. By having such intermediate section of the current waveform, the peak current may be kept relatively low, thereby reducing conduction and switching losses.

In an example, in the modulation mode, the power converter may for example be operable in at least one of the buck mode in which the second section of the current waveform is controlled to be a rising current, a boost mode in which the second section of the current waveform is controlled to be a falling current and an equal voltage mode in which the second section of the current waveform is controlled to be a constant current. Accordingly, by controlling the timing of the transition between the switching states, which will result in the respective current waveforms, the power converter can be operated in different operating modes, in which the DC voltage at the output may be stepped down (buck mode), stepped up (boost mode) or be kept substantially constant (equal voltage mode). Different operating modes may thus be achieved within the same modulation mode.

In an example, controlling the transition between the switching states may comprise controlling of the duration of the second section of the current waveform to adjust the period of the current waveform. The modulation frequency can thereby be adjusted in accordance with the respective application. The duration of the second section corresponds to the duration during which the power converter is operated in the second switching state, which is controlled accordingly. Increasing the length of the second section for example results in a reduced switching frequency and a reduced RMS inductor current with positive effects on the overall losses of the power converter.

During the period of the current waveform, the current flow through the inductor is not reversed. The current waveform thus corresponds to the current flow of the inductor current in the same direction through the inductor. As the waveform does not comprise times of reverse and close to zero current, the current waveform is better spread across the period so that for the same RMS current, lower peak currents are required. It should be clear that when the operation of the power converter is changed, for example by reversing the power flow, the current flow through the inductor may also be reversed; however, the converter is then again operated such that during a period of the current waveform, the current flow through the inductor is not reversed. For example, as the current of the third section is decreasing and reaches zero, the sequence may continue with the first switching state in which the current rises again and flows in the same direction, or the switching pattern may be reversed by switching on the other switches (opposite to the first switching state) so that the current is reversed at the end of the third section.

The sections of the current waveform may be substantially linear, but they may also have different shapes, depending on the depending on the properties of the power converter circuit and the operating point.

In an example, the transition from the first section to the second section of the current waveform may be controlled by transitioning the operation of the power converter from the first switching state to the second switching state upon the inductor current reaching a first threshold. Accordingly, the transition may not occur at fixed times, which would need to be determined for achieving the desired operating point of the converter, but a respective threshold for the inductor current may be employed. Similarly, the transition from the second section to the third section of the current waveform may be controlled by transitioning the operation of the power converter from the second switching state to the third switching state upon the inductor current reaching a second threshold. Two current thresholds may thus be employed for transitioning between the switching states of the power converter. It should be clear that the first threshold is generally reached by a rising current, whereas the second threshold may be reached by a rising current or a falling current, depending on whether the power converter operates in a buck mode or boost mode (i.e. be crossed from below or crossed from above). For an equal voltage mode, a timing may also be employed for the second transition to the third section of the waveform instead of a current threshold.

In an example, one of the first and second thresholds may be derived from a comparison of a current reference for an output current of the power converter and a monitored output current of the power converter (for example a threshold iL-ref may be derived). The other of the first and second thresholds may be determined from the derived threshold (iL-ref) and a desired duration (Tb) of the second section of the waveform (for example a threshold iL-ref-B). This allows an efficient control of the output current while facilitating implementation of the control scheme for different modulation modes.

The modulation mode may be at least one of a buck mode in which the first threshold is the threshold derived from the comparison (e.g. the threshold iL-ref) and a boost mode in which the second threshold is the threshold derived from the comparison (e.g. the threshold iL-ref).

The first threshold and/or the second threshold may for example be determined on the basis of an operating point of the power converter (e.g. input voltage, output voltage). It may further depend on an output current reference or power reference set for the output of the power converter. The reference or operating point may be set by an operator, or it may be determined automatically in dependence on the required power flow, for example by a respective controller (e.g. a charging controller of a power storage device).

In an example, controlling the transition between the switching states of the sequence comprises setting a current reference for an output current of the power converter, monitoring the output current of the power converter and applying an error signal between the current reference and the monitored output current to a PI (proportional integral) controller to derive at least one threshold value for the inductor current upon the reaching of which the power converter transitions to a next switching state. One of the two current references may for example be determined by such control scheme, whereas the other current reference may be derived from the first current reference, for example based on the desired operating point and operating characteristics of the power converter (as outlined above, there is at least one additional degree of freedom which can be adjusted to tune the operating characteristics, based on the setting of which the second threshold can be derived from the first threshold). Multiplication by a predetermined factor (determined based on the desired characteristics) may for example be used to derive the second threshold from the first threshold.

The first section of the current waveform may start at a value of zero current, and the third section of the waveform may end at a value of zero current. The waveform may in particular be controlled to have a transition from the third section to a first section of a subsequent period of the waveform by transitioning the operation of the power converter from the third switching state to the first switching state upon the inductor current reaching a zero current. A zero current switching of the switches from the third switching state to the first switching state may thus be implemented, resulting in lower switching losses.

The method may in particular perform zero current detection (ZCD) for detecting when the inductor current reaches a zero value and for accordingly triggering the switching from the third to the first switching state. The method may further perform a reference current detection (RCD) for detecting the reaching of the above-mentioned first and/or second thresholds.

The switching power converter may be a bidirectional DC-DC power converter, and in particular a cascaded bidirectional buck-boost converter, which may also be termed H-bridge buck-boost converter or four-switches buck-boost converter. It should however be clear that the respective current modulation is also applicable to other types of power converters. The switching power converter may for example be a unidirectional power converter (i.e. power flow in a predetermined direction). Further, the switching power converter may for example be an AC to DC, or DC to AC power converter.

In an example, the power converter may comprise first and second terminals on a first side of the power converter and third and fourth terminals on a second side of the power converter. A first interconnection point may be provided between a first switch and a second switch or diode, the first switch and the second switch or diode being connected in series between the first and second terminals. A second interconnection point is provided between a third switch or diode and a fourth switch, wherein the third switch or diode and the fourth switch are connected in series between the third and fourth terminals. The inductor may be connected between the first and second interconnection points. Accordingly, such converter circuit may correspond to an H-bridge in which the inductor is connected in the middle, i.e. it may correspond to two half-bridge structures that are connected at the intermediate points of each branch by the inductor. The reference or ground terminals of the two half-bridge structures may further be connected (e.g., the second terminal and the fourth terminal may be ground terminals that are connected). The switches/diodes and the inductor may form a converter cell. The power converter may not only comprise one such converter cell, but may comprise further converter cells that can for example be connected in parallel between the converter terminals. The power converter, in particular the converter cell, may further include a first capacitor connected between the first and the second terminals on the first side and a second capacitor connected between the third and fourth terminals on the second side. Such capacitor can maintain the output current while the inductor is being charged.

In some examples, the power converter may comprise at least two converter cells connected in parallel and operated by interleaving. Interleaving means that the current waveforms through the inductor (phase currents) of the different cells are phase-shifted with respect to each other, which results in a smoother output current of the power converter.

The switches are semiconductor switches, they are for example transistors, such as MOSFETs, IGBTs and the like. The switches and in particular the first to fourth switches, are IGBTs (insulated gate bipolar transistors).

The first switching state may correspond to the first switch being in a closed state and the fourth switch being in a closed state, wherein the second switch or diode is not conducting and the third switch or diode is not conducting. The second switching state may correspond to the first switch being in a closed state and the third switch or diode being in a conducting state (e.g. closed third switch), wherein the second switch or diode is not conducting and the fourth switch is not conducting (e.g. second and fourth switch open). The third switching state may correspond to the second switch or diode being in a conducting state and the third switch or diode being in a conducting state (e.g. second and third switch in closed state and/or body diodes (also termed free-wheeling diodes) of second and third switches conducting, or diodes conducting), wherein the first switch is not conducting and the fourth switch is not conducting (i.e. first switch and fourth switch in an open state). Such switching states allow an efficient generation of the current waveform of the inductor current, wherein the waveform and thus the different operating modes of the power converter can be controlled by controlling the transitions between these switching states. In the not conducting states, there is essentially no current flow through the respective switch or diode.

According to a further aspect, a controller of a switching power converter is provided. The power converter comprises an inductor and plural switches that are switchable to selectively connect the inductor between terminals of the power converter, wherein the controller is configured to provide a control signal for switching the plural switches in accordance with the repeating sequence of predetermined switching states. The controller is configured to perform the method in any of the configurations described herein. The controller is in particular configured to operate the power converter in the modulation mode and to control the current waveform of the current through the inductor in said modulation mode by controlling the transition between the switching states of the sequence. Thereby, advantages similar to the ones described above with respect to the method may be achieved.

According to a further aspect, a switching power converter, in particular a bidirectional DC-DC power converter, comprising an inductor and plural switches that are switchable to selectively connect the inductor between terminals of the power converter is provided. The power converter comprises a controller having any of the configurations or examples described herein. The power converter may in particular be a cascaded bidirectional buck-boost power converter.

In a further aspect, a computer program product (non-transitory computer readable storage medium having instructions, which when executed by a processor, perform actions) for controlling the operation of a switching power converter is provided. The computer program comprises control instructions which, when executed by a processing unit of a controller of the power converter, cause the processing unit to perform any of the methods described herein. The computer program may be provided on a volatile or non-volatile data carrier or storage medium.

It should be clear that the method may be carried out with the controller in any of the configurations or examples described herein. Further, the controller may be configured to performed any of the disclosed method steps.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 15 is a flow diagram illustrating a method according to an example; and

DETAILED DESCRIPTION

Figure 1:
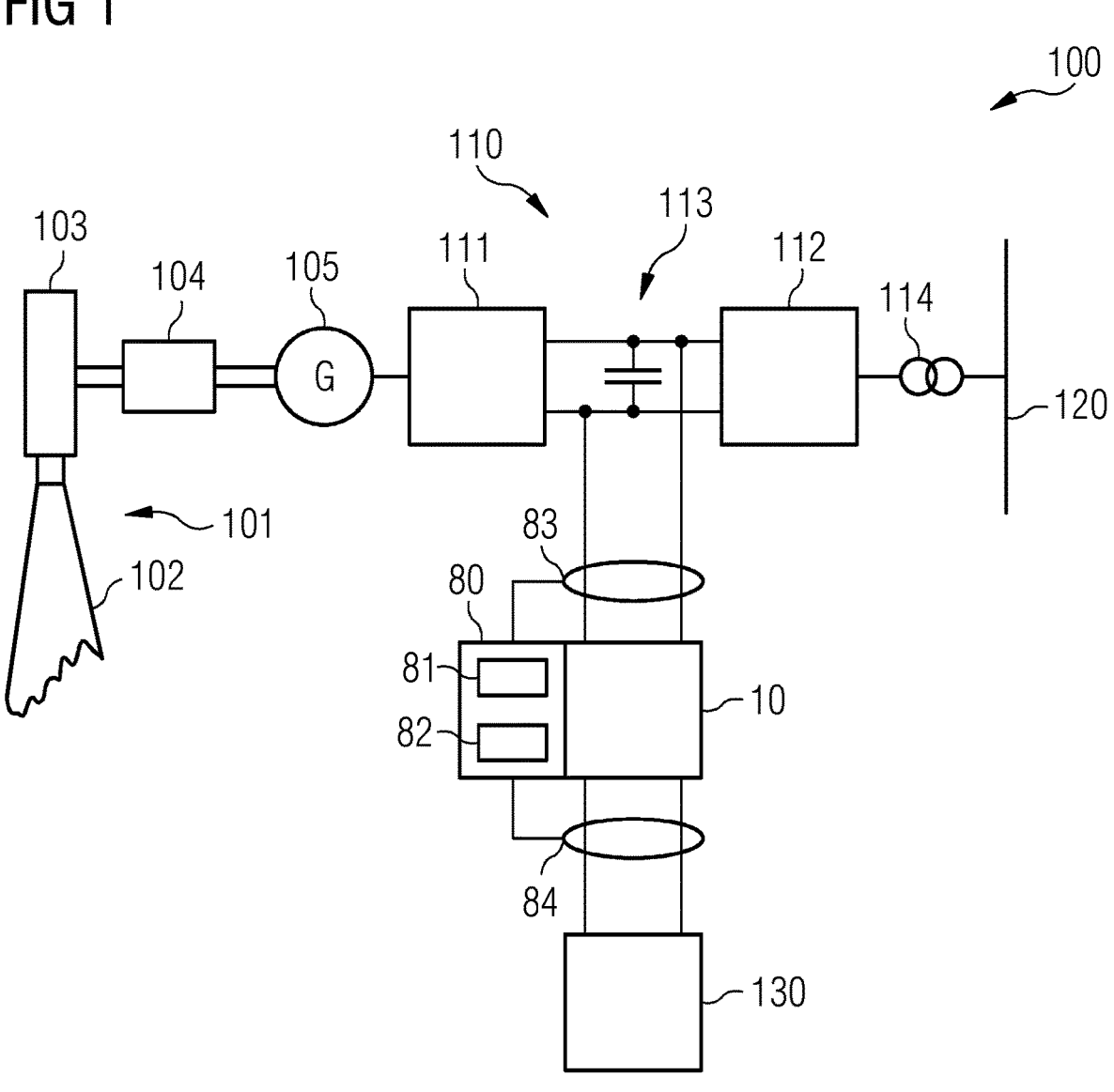
FIG. 1 is a schematic drawing showing a power converter in an exemplary application according to an example.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 illustrates schematically a power converter 10, which is a bidirectional DC-DC power converter, in an exemplary application in a wind turbine 100. Wind turbine 100 includes a rotor 101 with rotor blades 102 and rotor hub 103 that is coupled via an optional gearbox 104 to a generator 105. Electrical power generated by generator 105 is converted by the AC/AC converter 110 and fed via a transformer 114 to a power grid 120, which can be a local wind farm grid or a utility grid or the like. The AC/AC power converter 110 includes a grid side converter 112 and a generator side converter 111 that are coupled by a DC-link 113. The DC-DC converter 10 may be used to couple an energy storage device 130 to the DC link 113. The energy storage device 130, such as a battery, may thus be provided with the correct DC voltage level for either charging or discharging the storage device, wherein the power converter 10 provides bidirectional power flow to either extract electrical energy from DC-link 113 during charging or to supply electrical energy to DC-link 113 during discharging. It should be clear that this is only an exemplary application, and that the DC-DC power converter 10 can be used in any suitable application, for example on different power system topologies, on solar power generating devices, and in other applications, where bidirectional DC-DC power conversion is required.

Power converter 10 may need to step up or step down the voltage and may therefore be implemented as a cascaded buck-boost converter. Such power converter may be operated in different modulation modes, whereas known modulation modes are the continuous conduction mode (CCM) or the boundary conduction mode (BCM). The present solution provides a modulation mode in which the current waveform of the inductor current has three sections, which may therefore be called "three-stage conduction mode" (TCM), which is described in more detail further below.

Figure 2:
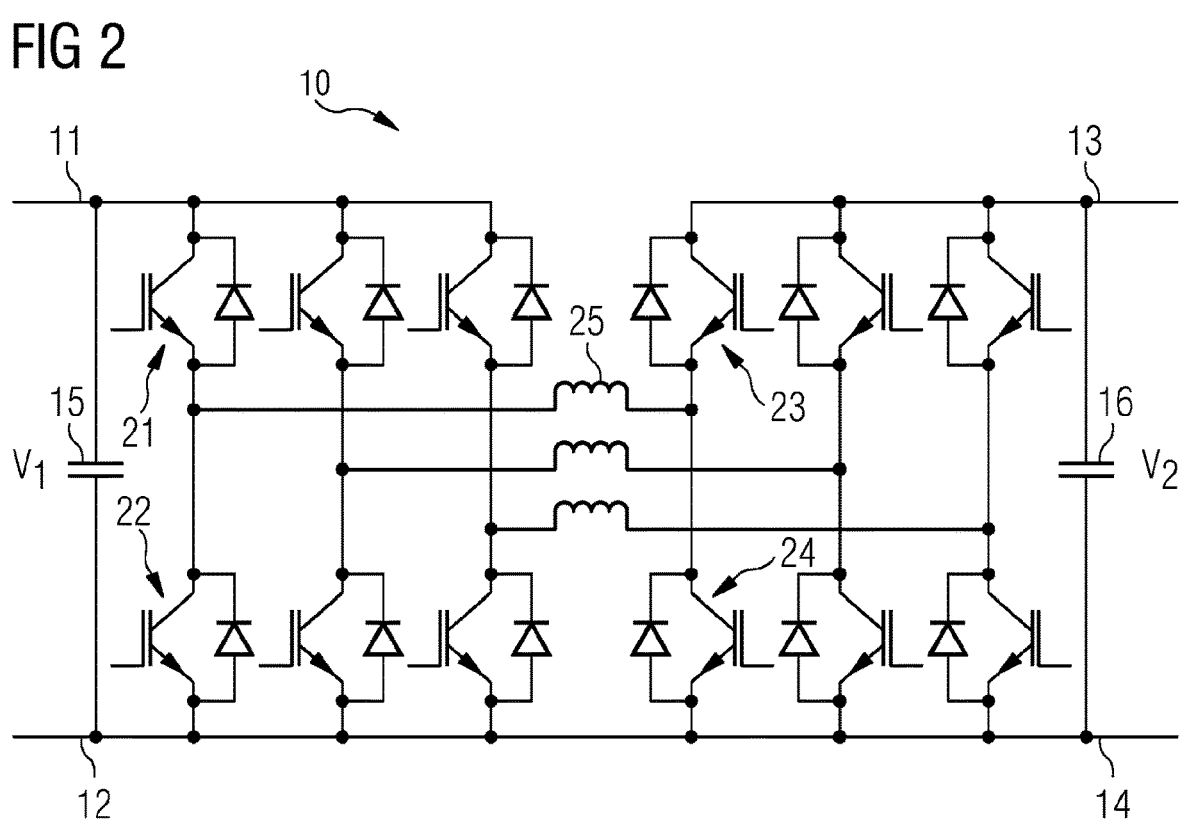
FIG. 2 is a schematic drawing showing a power converter according to an example.

FIG. 2 schematically illustrates an example of a power converter 10 that includes three converter cells, wherein each converter cell 20 includes semiconductor switches 21, 22, 23, 24 and an inductor 25. A capacitor 15 is further coupled between first and second terminals 11, 12 on a first side of the power converter and a further capacitor 16 is coupled between the third and fourth terminals 13, 14 of a second side of the power converter. In the example of FIG. 2, three converter cells are connected in parallel between converter terminals, and they may be operated in an interleaving manner in which the inductor currents through the respective inductors 25 are phase-shifted (e.g. by about 120°), thus improving the output quality and reducing the filtering requirements for the converter output. Current through the inductor 25 may thus also be termed "phase current", as the three converter cells essentially correspond to three phases. It should be clear that the power converter 10 may only comprise one converter cell, or a different number, such as one, two, three, four or even more converter cells.

Figure 3:
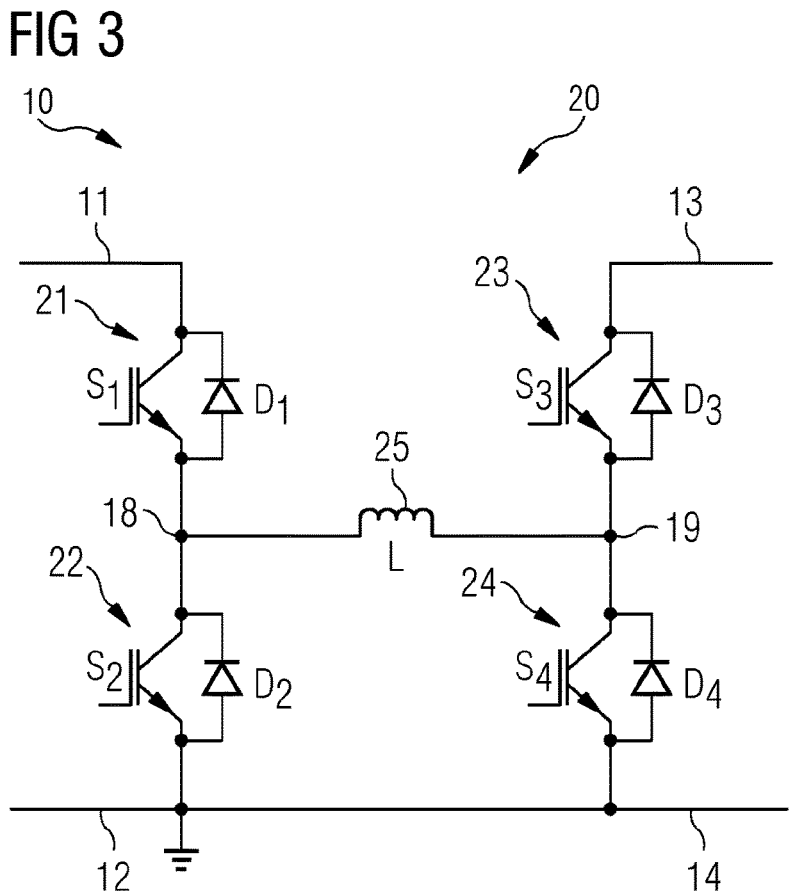
FIG. 3 is a schematic drawing showing a power converter according to an example.

A converter cell 20 of power converter 10 is illustrated in more detail in FIG. 3. First and second switches 21, 22 (S1, S2) which comprise the body diodes D1, D2 are connected in series between first and second terminals 11, 12. Third and fourth switches 23, 24 (S3, S4) that include the body diodes D3 and D4 are connected in series between the third and fourth terminals 13, 14. Between the interconnection points 18, 19, the inductor 25 having inductance L is connected. Power converter 10 can now be operated in a sequence of switching states, wherein each switching state defines which switches S1 to S4 are opened or closed, thereby controlling the current flow through the power converter. A switching state may thus also be termed "conduction scheme". The general principle of operating such switching power converter is known and will thus not be explained in greater detail here.

The switches are semiconductor switches and are implemented as IGBTs. Other configurations are conceivable, such as using MOSFETs, thyristors, or the like.

Power converter 10 may include a controller 80 that controls the switching of the switches in accordance with a predetermined sequence of switching states, which controls the waveform of the current through inductor 25. As illustrated in FIG. 1, the controller 80 may include a processing unit 81 and a memory 82 that stores control instructions which are executed by processing unit 81. Processing unit 81 may for example include a digital signal processor, an application specific integrated circuit, a field programmable gate array, a microprocessor or the like. Memory 82 may include RAM, ROM, Flash Memory, a hard disk drive and the like. Controller 80 may make voltage measurements and/or current measurements 83, 84 on either side of power converter 10 or may receive respective measurement data, which is used in the control as explained further below.

Figure 4:
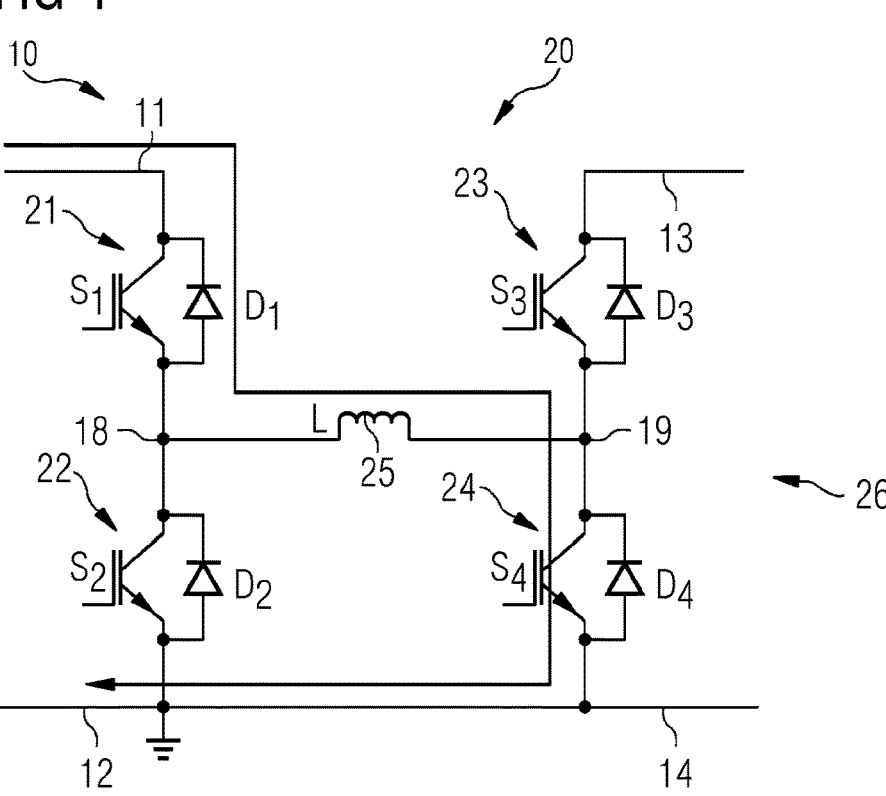
FIG. 4 illustrates a first switching state.
Figure 5:
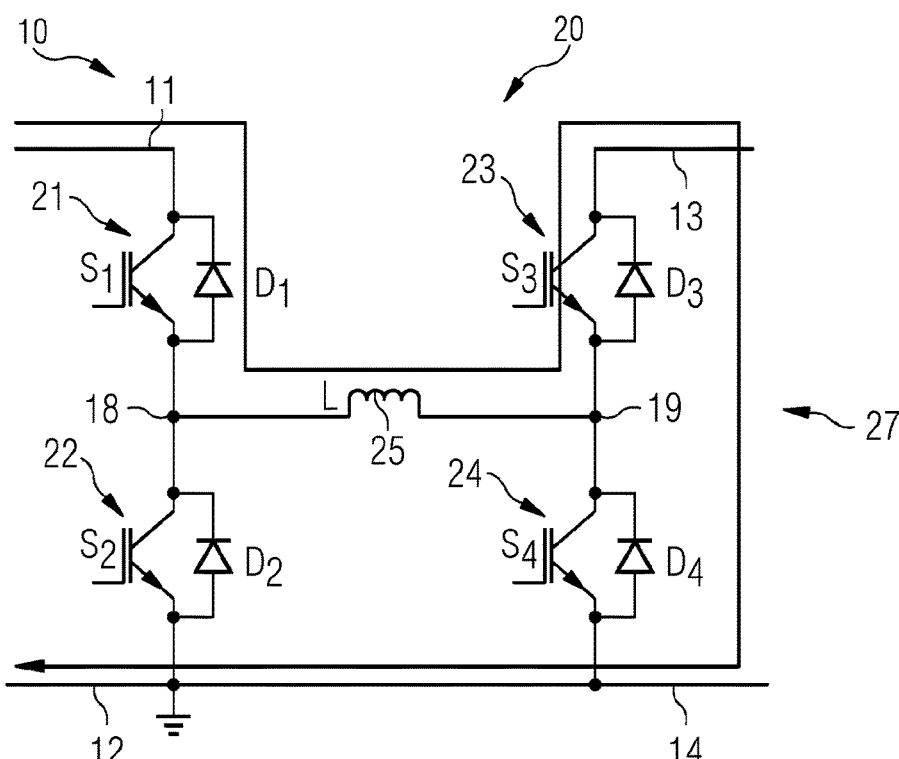
FIG. 5 illustrates a second switching state.
Figure 6:
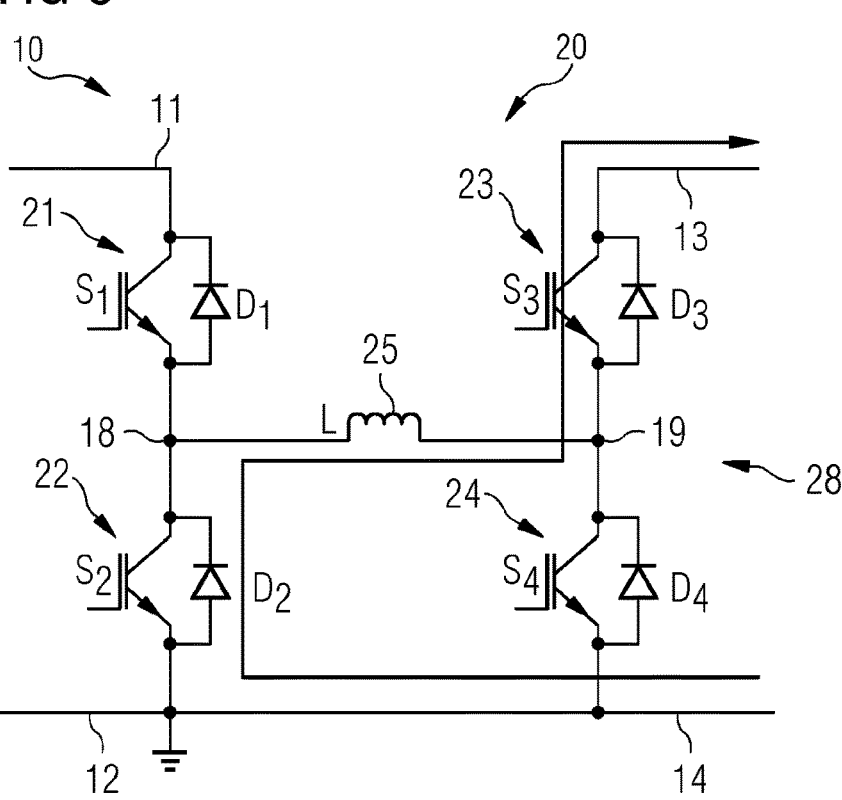
FIG. 6 illustrates a sequence of switching states of a power converter according to an example.

Conventional modulation modes may result in relatively high switching and conduction losses. This can be a significant drawback, in particular for power converters in the megawatt range. Also, the cooling requirements are quite significant when experiencing such high power losses. Examples of the present solution control the switches of the power converter in accordance with a modulation scheme that may reduce such losses and may further provide an increased flexibility of operation. FIGS. 4 to 6 illustrate an example of the sequence of switching states 26, 27, 28 of this modulation mode. A first switching state 26 is illustrated in FIG. 4, in which switches S1 and S4 are closed. Switches S2 and S3 are open, and the respective diodes D2, D3 are not conducting. The example assumes a power flow from left to right, so the load is coupled to the third and fourth terminals 13, 14. Capacitors 15, 16 are not shown. In the switching state of FIG. 4, the current flows through the inductor 25 which is thereby energized (energy is stored in the magnetic field), which results in the inductor current rising with time.

Figure 7:
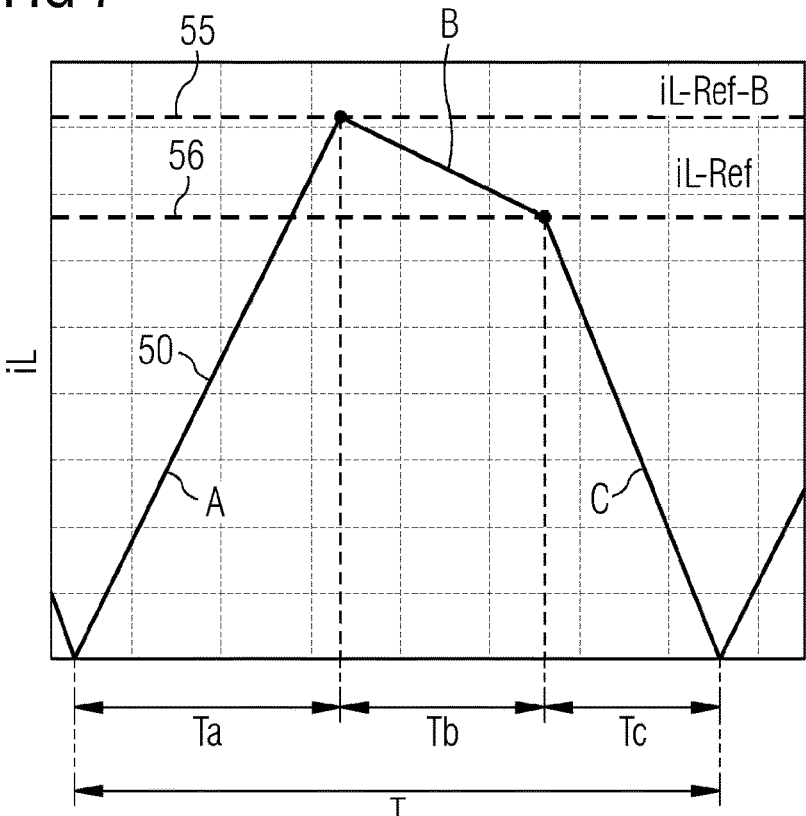
FIG. 7 is a schematic diagram illustrating a current waveform of an inductor current when operating in a boost mode according to an example.

FIG. 7 illustrates the current waveform of the current through inductor 25, and section A corresponds to the first switching state 26 of FIG. 4. In this state, the load is supplied with current from the capacitor 16. After a fraction Ta of the period T of the current waveform, the second switching state 27 illustrated in FIG. 5 is applied. In particular, switch S4 is opened and the current flows via switch S3, in particular via its body diode or freewheeling diode D3 which becomes conducting. This causes the current to flow via the load and charging capacitor 16. The controller may close switch S3, but it should be clear that the current flows via diode D3, as the switch, e.g. IGBT, may not be bidirectional. Depending on input voltage V1 and output V2, the voltage applied by the inductor 25 in the switching state 27 of FIG. 5 causes the inductor current iL to either rise (buck mode) or fall (boost mode). This is illustrated in the section B of the current waveform 50 in FIG. 7, wherein the falling current indicates operation in the boost mode. After time Tb, operation transitions from the second switching state 27 of FIG. 5 to the third switching state 28 of FIG. 6, wherein the first switch 21 is opened and the diode D2 of the second switch 22 becomes conducting, resulting in a current flow via diodes D2, D3 through inductor 25. The controller may apply a positive gate-emitter voltage to switch 22, i.e. switch S2 may be closed, but it should be clear that this is not required as the current will flow through the body diode D2. The inductor 25 supplies the stored energy to the load and is essentially discharged, resulting in the falling current illustrated in section C of current waveform 50. After the third switching state 28, the switching sequence ends and is repeated, resulting in a periodic waveform of the inductor current iL with the period T, corresponding to the duration of the switching sequence.

The transition from the third switching state 28 of FIG. 6 to the first switching state 26 of FIG. 4 of the next period, i.e. from section C to section A of the next period of the current waveform 50, may for example occur upon the inductor current iL reaching a zero value. Zero current detection (ZCD) may therefore be employed. The current waveform 50 may thus consist of the sections A, B and C within one period T. The switching sequence may consist of the first, second, and third switching states 26, 27, 28 illustrated in FIGS. 4 to 6. As illustrated in FIG. 7, there is no reversal of the inductor current iL during the period T of the current waveform 50. Furthermore, there are no additional sections (corresponding to additional switching states) between sections A, B, C of the current waveform. Accordingly, if the time Ta, Tb or Tc (i.e. the duration) of the respective section A, B, C of the current waveform 50 is changed, the period T of the current waveform and thus the frequency of the current modulation changes. By controlling the duration during which one of the first, second or third switching states is applied, the period of the current waveform and thus the modulation frequency can be adjusted. The modulation mode may thus be a variable frequency modulation mode.

Figure 8:
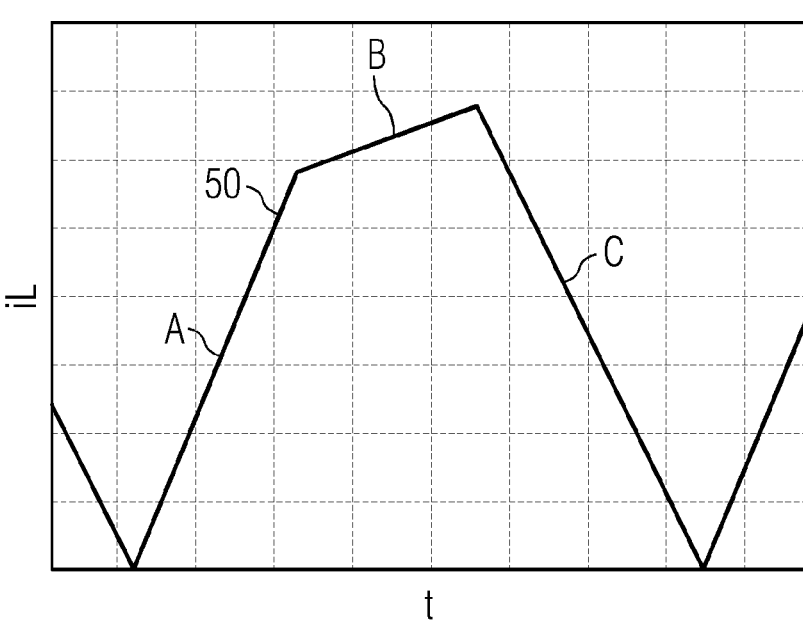
FIG. 8 is a schematic diagram illustrating a current waveform of an inductor current when operating in a buck mode according to an example.

As indicated above, FIG. 7 corresponds to a boost mode of operation in which the input voltage is lower than the output voltage. FIG. 8 illustrates operation of the power converter in a buck mode in which the input voltage is greater than the output voltage. In the buck mode, the current is formed differently in the central section B of the current waveform 50. As illustrated in FIG. 8, if the input voltage is higher than the output voltage, the inductor current will continue to build up in section B (i.e. in the switching state of FIG. 5), resulting in the desired power transfer to the load side.

As shown, the current waveform within one period has a quadrilateral shape with three stages, so that the modulation mode may be termed "three-stage conduction mode" (TCM). The modulation together with the converter topology allows a bidirectional power flow, so that the converter can be employed in energy storage applications which require charging and discharging. The relationship between input and output voltage of the converter is not relevant, so it allows buck (step down) or boost (step up) operation. The current is naturally built up as a function of the voltage ratio, and no additional consideration has to be given to the mode of operation.

It should be clear that the converter 10 can also be implemented as a unidirectional power converter. For example for a power flow from the left side to the right side, i.e. from V1 (terminals 11, 12) to V2 (terminals 13, 14), the switches S2 and S3 may be replaced by diodes, in correspondence to the body diodes D2 and D3. As outlined above, the switching sequence explained with respect to FIGS. 4-6 can be applied, since the current flows through diodes D3, or D2 and D3 during switching states 27 or 28, respectively. It may also be implemented as a unidirectional power converter with the power flow in the reverse direction, i.e. from V2 to V1. In such case, the current flow would be reversed (i.e. iL would be negative). The switching sequence would then comprise a switching of switches S2 and S3, wherein the current would flow through body diode D1 in the second switching state and through diodes D1 and D4 in the switching state. Accordingly, switches S1 and S4 can be replaced by respective diodes corresponding to the body diodes D1 and D4 in such unidirectional configuration.

Figure 9:
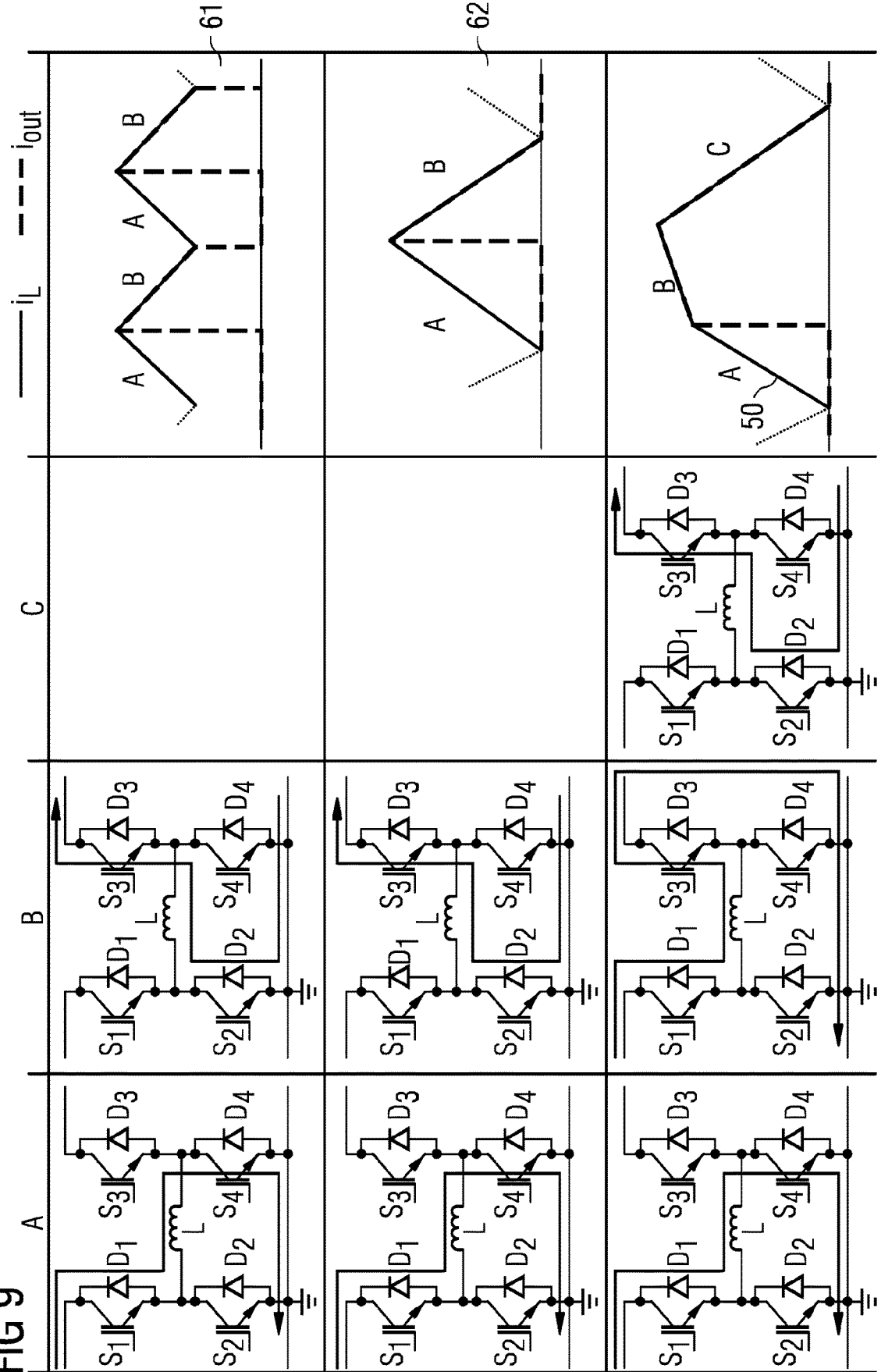
FIG. 9 is a schematic drawing comparing switching states and current waveform of different modulation modes.
Figure 10:
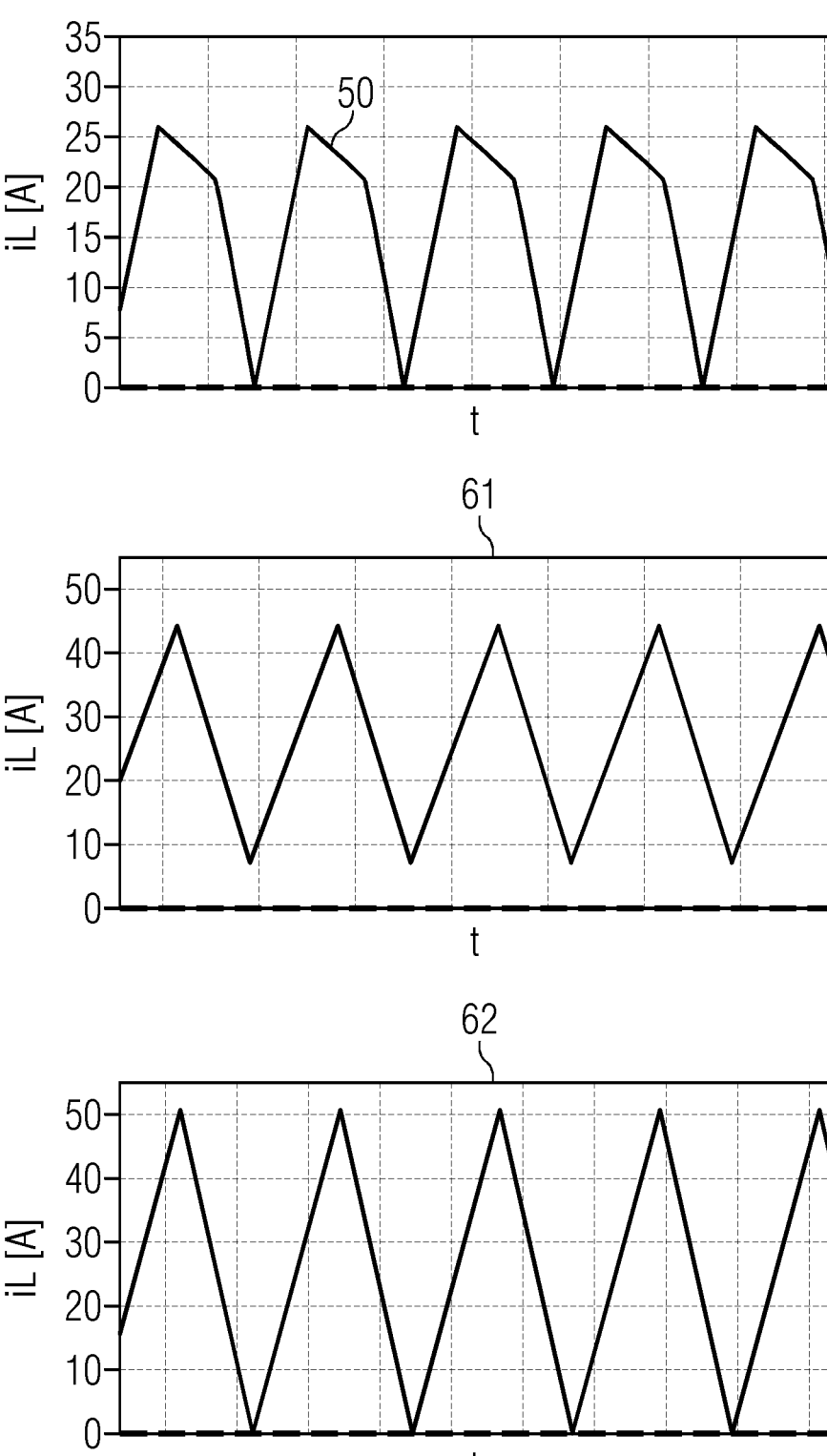
FIG. 10 shows diagrams of the current waveform of different modulation modes.

FIG. 9 illustrates a comparison of the present TCM to the conventional continuous conduction mode (CCM) 61 in the first row of the table and the boundary conduction mode (BCM) 62 in the second row of the table. Both CCM and BCM have two switching states, wherein in switching state A, the inductor is charged and in switching state B, the inductor is discharged. In CCM, the inductor current iL never reaches a value of zero. The right hand column of FIG. 9 illustrates the inductor current iL and the output current $i_{out}$. In the BCM mode, the inductor current iL reaches zero value, upon which switching to the next switching state occurs. The current waveform 50 of the TCM mode includes an additional degree of freedom which allows an adjustment of the RMS current through the converter. FIG. 10 illustrates the inductor current for the waveform 50 of the TCM mode, as well as for the CCM modulation mode 61 and the BCM modulation mode 62 for comparable input and output voltages and power transfer. As can be seen, the peak currents both in the CCM mode 61 and the BCM mode 62 are significantly higher than for TCM. Furthermore, the RMS inductor current is higher in these modes compared to the TCM mode having current waveform 50. Although the CCM mode may also be operated so as to reduce the RMS current, e.g. by using a higher switching frequency, the switching losses in the CCM are higher than in disclosed TCM mode.

Figure 11:
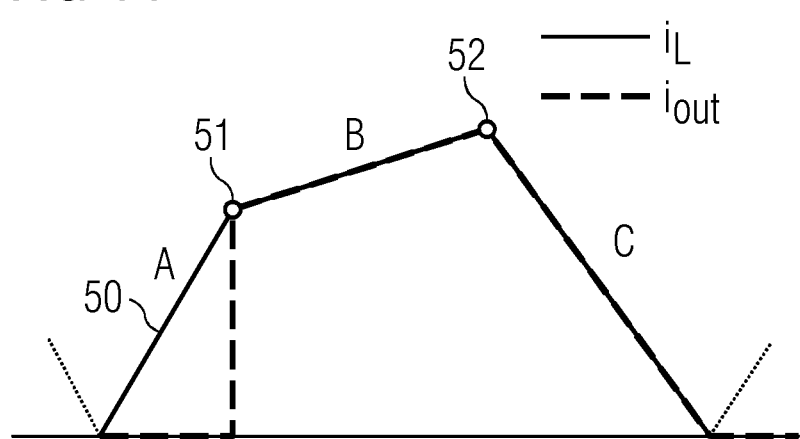
FIG. 11 is a schematic diagram illustrating transitions between switching states in a current waveform according to an example.

By employing the TCM modulation, a large amount of energy can be converted with relatively low losses. With respect to FIG. 11, the switching losses and conduction losses are briefly explained. At the beginning of section A, there are no turn-on losses in switch S1 or switch S4 as the current value is zero. At the beginning of section B, there are losses when the switch S4 is turned off (transition point 51) and furthermore, there are losses at the beginning of section C when the switch S1 is turned off (transition point 52). However, as illustrated in FIG. 10, the maximum currents and RMS currents are significantly lower at which the switching occurs.

Furthermore, there are no recovery losses in diodes D2 and D3 at the end of section C, since the circulating current is close to zero. Accordingly, there are only losses when the switches are switched off at the intermediate points 51, 52 and there are virtually no losses of ignition (switch-on losses) during the operation.

Regarding the conduction losses, during the first section A, the current flows through the switches S1 and S4. During section B, the current flows through switch S1 and diode D3, and finally in section C, it flows through diodes D2 and D3. The current therefore flows quite uniformly through all the semiconductor elements involved throughout the switching period.

Figure 12:
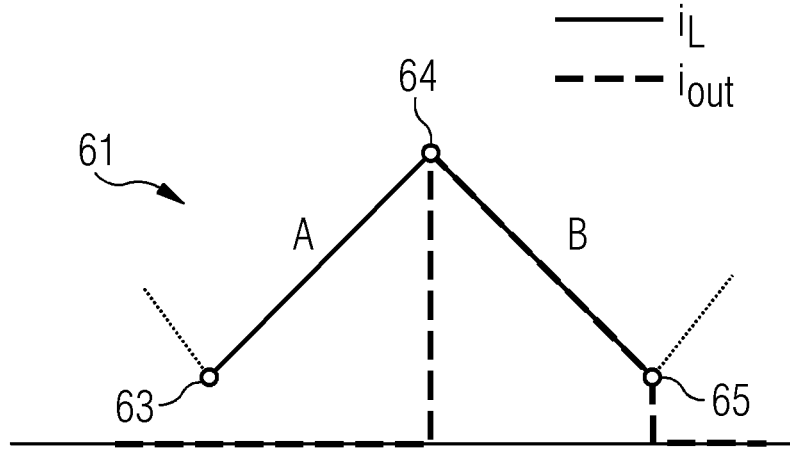
FIG. 12 is a schematic diagram illustrating transitions between switching states in a current waveform of a conventional modulation mode.

FIG. 12 illustrates the switching and conduction losses for the case of CCM modulation. At point 63, switching losses occur as switches S1 and S4 are switched on. At point 64, switching losses occur as switches S1 and S4 are turned off. At point 65, recovery losses occur as diodes D2 and D3 stop conducting. Conduction losses occur during section A in switches S1 and S4 and during section B in diodes D2 and D3.

Figure 13:
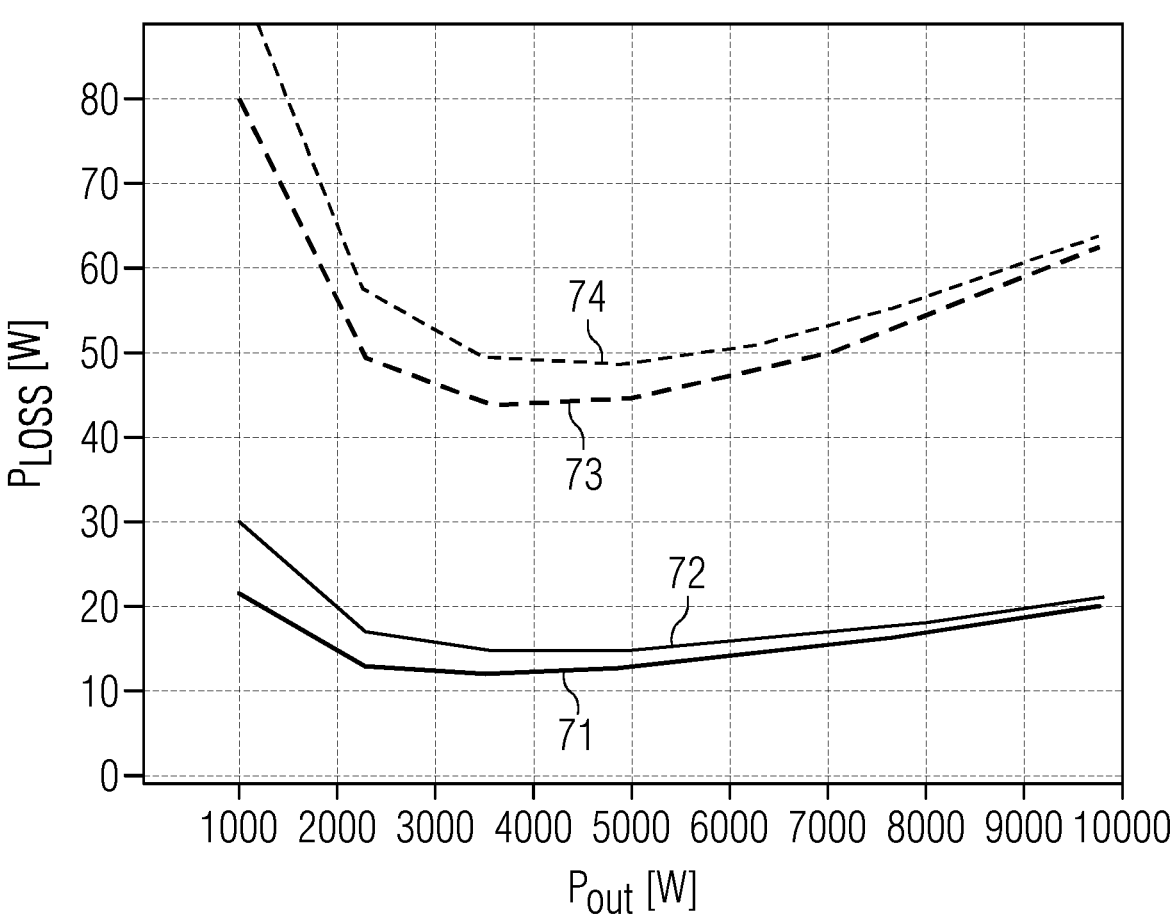
FIG. 13 is a schematic diagram comparing switching losses for different modulation modes and different operating modes.

When comparing the TCM mode with the BCM mode, the RMS current is much lower in the TCM case, so that switching and conduction losses will be much lower over the converter operating range (see FIG. 10). This may also have a positive effect on other factors, such as output ripple. To compare the losses, a parameter αV is introduced that corresponds to the ratio between the input and output voltages: αV=Vin/Vout. Turning to FIG. 13, losses are compared between the TCM mode according to any of the examples disclosed (curve 71 for αV=0.952 and curve 72 for αV=1.048) and the BCM mode (curve 73 for αV=0.952 and curve 74 for αV=1.048). As can be seen, over a range of output powers $P_{out}$, the losses $P_{loss}$ in units of Watt are significantly lower for the TCM modulation mode, both in buck and boost operation.

Figure 16:
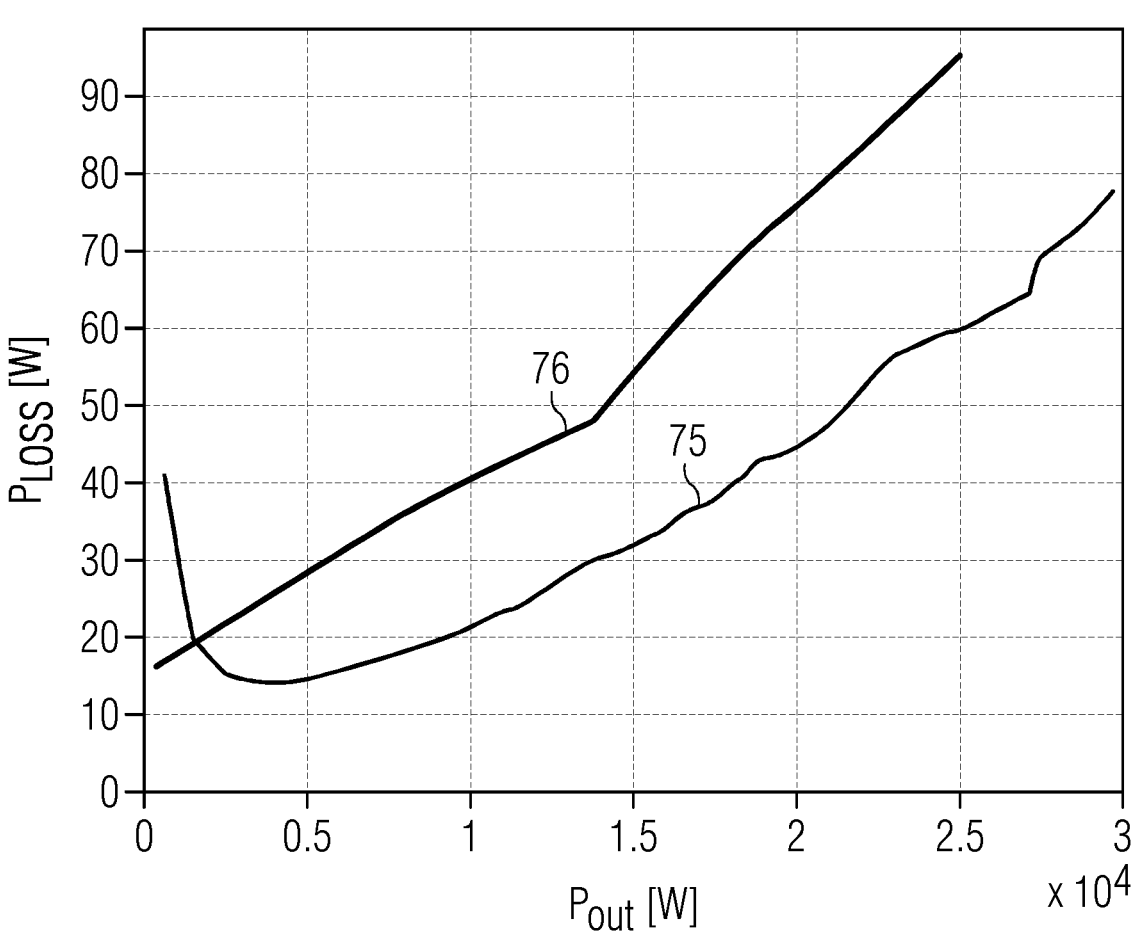
FIG. 16 is a schematic diagram comparing switching losses for different modulation modes and different operating modes.

Similarly, when comparing the TCM mode to the continuous type switching mode CCM, the losses in the CCM mode are also significantly higher than in the TCM mode, since the RMS current through the inductor is higher resulting in higher switching losses. Furthermore, as explained with respect to FIG. 12, there is no soft-switching (at zero current) at any time. FIG. 16 illustrates respective losses, wherein curve 75 shows the losses for the TCM modulation mode, whereas curve 76 shows the losses for the CCM modulation mode at comparable operating conditions. Accordingly, there are significant benefits in terms of switching and conduction losses of the present TCM mode compared to the conventional CCM mode.

The TCM modulation mode disclosed herein may achieve a higher efficiency and less losses than the conventional modes, both with regards to conduction and switching losses. Furthermore, the time period Tb of the second section B of the current waveform can be adjusted. This allows a further degree of freedom that in particular enables an adjustment of the RMS inductor current, so that the RMS current may be reduced by increasing the Tb parameter. Furthermore, this has the effect that the period T of the current waveform is increased and thus the switching frequency is reduced. Thereby, the overall losses of the power converter 10 can be further decreased. On the other hand, this may lead to a higher ripple of the output current so that a compromise may be found between the efficiency of the converter and the ripple and characteristics of the output current.

Furthermore, varying the duration of the time interval TB (FIG. 7) allows the switching frequency or modulation frequency to be changed according to the specific needs of the application for which the converter is intended, thus increasing the possible applications and range of operation.

Figure 14:
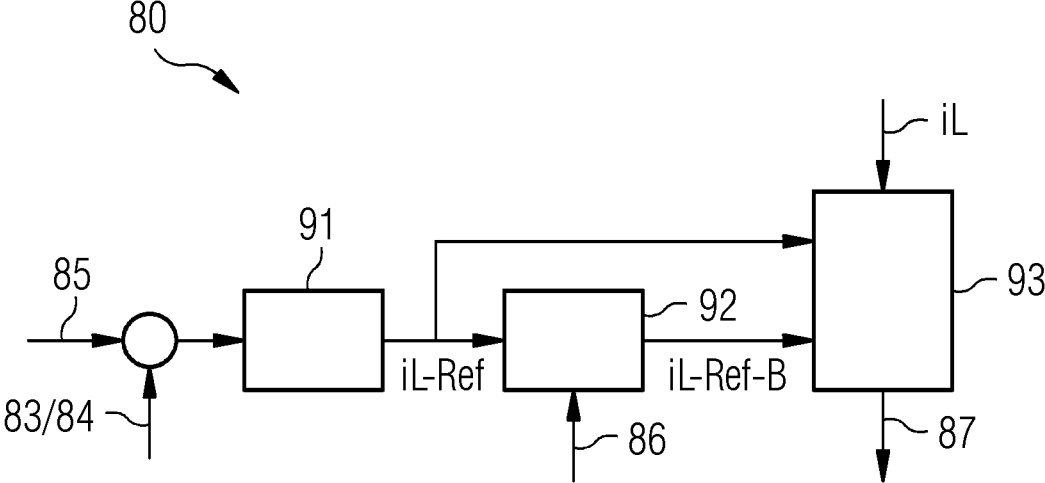
FIG. 14 is a schematic drawing showing a controller of a power converter according to an example.

FIG. 14 illustrates an example of the controller 80 of the power converter 10. The control structure shown in FIG. 14 may for example be implemented by means of the above-mentioned processing unit 81 and memory 82. An output current reference 85 for the power converter 10 is provided, and the measured output current 83/84 (depending on the direction of the power flow; see FIG. 1) is subtracted. The resulting error signal is provided to a proportional integral (PI) regulator 91, which provides a respective current reference iL-Ref.

In order to efficiently control the inductor current iL, the control may use thresholds or reference values iL-Ref and iL-Ref-B for the inductor current. Upon the inductor current reaching the respective threshold value, the transition to the next switching state is triggered, i.e. the respective trigger signals for the switches are provided to change the switching state. For the transition from the first switching state to the second switching state, a first threshold 55 is provided, and for the transition from the second switching state to the third switching state (i.e. from section B to section C), a second threshold 56 is provided. In the example of FIG. 7, the first threshold 55 corresponds to the value iL-Ref-B, which is the higher reference value, and the second threshold 56 corresponds to the value iL-Ref, which is the lower reference value. The controller dynamically sets the values iL-Ref and iL-Ref-B according to the current/power requirements, the drive characteristics and the desired duration of the Tb interval, which can be set variably as indicated above.

The PI regulator 91 is accordingly configured to set the value iL-Ref so that the desired output current reference 85 is achieved at the output of the converter. A calculation unit 92 is then employed to calculate based on this value iL-Ref, the value of the parameter iL-Ref-B from the desired time interval Tb. This is established according to the voltage ratio and the operation profile which seeks a compromise between the converter efficiency and the output current ripple. Accordingly, the calculation unit 92 receives an input 86 that may include the input voltage, the output voltage and the desired operational profile. As indicated above, Tb can be adjusted to reduce the RMS current (by increasing Tb) to reduce converter losses. The reference values iL-ref and iL-ref-B are then provided to a modulator 93, which may be termed "TCM modulator". TCM modulator 93 monitors the inductor current iL and detects if the current iL reaches the respective threshold. For example, during the first switching state 26 (section A), inductor current is compared to the first threshold 55 and during the second switching state 27 (section B), inductor current is compared to the second threshold 56 by modulator 93. The respective trigger signals are then provided to the switches of the power converter as a control signal 87, in order to transition from the respective switching state to the next switching state as explained above with respect to FIGS. 4 to 6. The switch trigger signals can thereby be established in accordance with the evolution of the inductor current. Modulator 93 thus performs reference current detection (RCD). Furthermore, modulator 93 detects if the inductor current reaches a value of zero current (in particular during the third switching state 28 (section C)), upon which it triggers the transition to the section A of the next period. Accordingly, modulator 93 also performs zero current detection (ZCD).

It should be noted that the converter 80 may be configured to always determine the value iL-Ref as being the lower reference value and the value iL-Ref-B as the higher reference value for the inductor current. Unit 92 may for example apply a corresponding multiplication factor>1. Accordingly, in the boost mode of FIG. 7, the first threshold 55 may correspond to iL-Ref-B and the second threshold 56 to iL-Ref. When operating in a buck mode, the first threshold 55 may be set to iL-Ref and the second threshold 56 may be set to iL-Ref-B. This is only an exemplary implementation, and other implementations are conceivable (e.g. setting the second threshold always to iL-ref and changing the multiplication factor of unit 92 when changing from buck to boost operation).

FIG. 15 shows a flow diagram of a method according to an example. The method may be performed by the controller 80 and the power converter 10 having any of the above outlined configurations or according to any of the disclosed examples. In step S10, the power converter is operated in the TCM modulation mode, in which a repeating sequence of the switching states illustrated in FIGS. 4 to 6 is applied. In step S11, first and second current thresholds 55, 56 are derived from the output current reference 85, from the input/output voltages and from the desired operating profile, as explained above. In step S12, the inductor current iL is monitored. In step S13, upon the inductor current reaching the first current threshold 55, operation is transitioned from the first switching state of FIG. 4 to the second switching state of FIG. 5. In step S14, upon the inductor current reaching the second threshold 56, operation is transitioned from the second switching state of FIG. 5 to the third switching state of FIG. 6. In step S15, upon the inductor current reaching a zero value, operation is transitioned from the third switching state of FIG. 6 to the first switching state of FIG. 4 of the next period of the current waveform. Accordingly, a switching sequence is completed and the method returns to step S11. It should be clear that during operation, the thresholds may change, for example when experiencing changes in input/output voltages or in a desired power flow, e.g. due to load changes or the like. Consequently, the references may be adjusted during operation. This may furthermore result in a change of the period T of the waveform during operation and thus in a change of the modulation frequency. However, as described above, operation of the power converter can handle such frequency changes, so that the power converter allows operation with variable modulation frequency.

Compared to conventional modulation schemes, the operation of the power converter may thus achieve a higher efficiency over most of the operating range for equal input/ output voltages and power flow. In particular, switching losses are significantly reduced and no recovery losses are present in the diodes. The converter can further operate under variable switching/modulation frequency, which can thus be adjusted in accordance with the respective application conditions of the converter, allowing an increasing of the power transfer, reduction of the phase RMS current and thus reduction of conduction losses. Providing such variable frequency modulation thus provides significant benefits.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of operating a switching power converter, wherein the power converter comprises an inductor and a plurality of switches that are switchable to couple the inductor to terminals of the power converter, the method comprising:

operating the power converter in a modulation mode in which a current through the inductor is modulated by operating the power converter in a repeating sequence of predetermined switching states of the plurality of switches;

controlling a current waveform of the current through the inductor in the modulation mode by controlling a transition between the switching states of the repeating sequence, wherein the current waveform is controlled to include within one period of the current waveform:

a first section of rising current corresponding to a first switching state, a second section corresponding to a second switching state, wherein the second section of the current waveform does not reach or cross a zero value of the current, and a third section of falling current corresponding to a third switching state, wherein the first section of the current waveform follows in direct succession to the third section of the preceding period of the current waveform, and wherein the control of the current waveform allows a length of a period of the current waveform to change, wherein in the modulation mode, a transition from the first section to the second section of the current waveform is controlled by transitioning the operation of the power converter from the first switching state to the second switching state upon the inductor current reaching a first threshold and wherein a transition from the second section to the third section of the current waveform is controlled by transitioning the operation of the power converter from the second switching state to the third switching state upon the inductor current reaching a second threshold, wherein one of the first and second thresholds is derived from a comparison of a current reference for an output current of the power converter and a monitored output current of the power converter, and wherein the other of the first and second thresholds is determined from the derived threshold and a desired duration of the second section.

2. The method according to claim 1, wherein the modulation mode is at least one of a buck mode in which the first threshold is the threshold derived from the comparison, or a boost mode in which the second threshold is the threshold derived from the comparison.

3. The method according to claim 1, wherein within one waveform period, the waveform consists of the first section, the second section, and the third section.

4. The method according to claim 1, wherein a magnitude of a slope of the second section of the current waveform is less that a magnitude of a slope of the first section and/or the third section of the current waveform.

5. The method according to claim 1, wherein in the modulation mode, the power converter is operable in at least one of:

a buck mode in which the second section of the current waveform is controlled to be a rising current, a boost mode in which the second section of the current waveform is controlled to be a falling current, and an equal voltage mode in which the second section of the current waveform is controlled to be a constant current.

6. The method according to claim 1, wherein controlling the transition between the switching states comprises controlling the duration of the second section of the current waveform to adjust the period of the current waveform.

7. The method according to claim 1, wherein during the period of the current waveform, the current flow through the inductor is not reversed.

8. The method according to claim 1, wherein controlling the transition between the switching states of the sequence comprises setting current reference for the output current of the power converter, monitoring the output current of the power converter, and applying an error signal between the current reference and the monitored output current to a controller to derive the threshold value for the inductor current upon the reaching of which the power converter transitions to a next switching state.

9. The method according to claim 8, wherein the controller is a proportional integral regulator.

10. The method according to claim 1, wherein the current waveform is controlled to have a transition from the third section to a first section of a subsequent period of the current waveform by transitioning the operation of the power converter from the third switching state to the first switching state upon the inductor current reaching a zero current.

11. The method according to claim 1, wherein the power converter comprises:

first and second terminals on a first side of the power converter, and third and fourth terminals on a second side of the power converter, a first interconnection point between a first switch and a second switch or diode, the first switch and the second switch or diode being connected in series between the first and second terminals, and a second interconnection point between a third switch or diode and a fourth switch, the third switch or diode and the fourth switch being connected in series between the third and fourth terminals, wherein the inductor is connected between the first and second interconnection points.

12. The method according to claim 11, wherein the first switching state corresponds to the first switch being in a closed state and the fourth switch being in a closed state, wherein the second switch or diode is not conducting and the third switch or diode is not conducting, and/or wherein the second switching state corresponds to the first switch being in a closed state and the third switch or diode being in a conducting state, wherein the second switch or diode is not conducting and the fourth switch is not conducting, and/or wherein the third switching state corresponds to the second switch or diode being in a conducting state and the third switch or diode being in a conducting state, wherein the first switch is not conducting and the forth switch is not conducting.

13. A controller of a switching power converter, wherein the power converter comprises an inductor and a plurality of switches that are switchable to couple the inductor to terminals of the power converter, wherein the controller is configured to provide a control signal for switching the plurality of switches in accordance with a repeating sequence of predetermined switching states, wherein the controller is further configured to perform the method of claim 1.

14. A switching power converter comprising an inductor and the plurality of switches that are switchable to couple the inductor to terminals of the power converter, wherein the power converter further comprises the controller according to claim 13.

15. A computer program product, comprising a non-transitory computer readable hardware storage device having computer readable program code stored therein, said program code executable by a processor of a computer system to implement a method of claim 1.

* * * * *